US008778061B2

(12) United States Patent
Kurosawa (10) Patent No.: US 8,778,061 B2
(45) Date of Patent: Jul. 15, 2014

(54) HYDROGEN GAS RECOVERY SYSTEM AND HYDROGEN GAS SEPARATION AND RECOVERY METHOD

(75) Inventor: Yasushi Kurosawa, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 293 days.

(21) Appl. No.: 13/501,522

(22) PCT Filed: Jul. 26, 2010

(86) PCT No.: PCT/JP2010/004754
§ 371 (c)(1),
(2), (4) Date: Apr. 12, 2012

(87) PCT Pub. No.: WO2011/045880
PCT Pub. Date: Apr. 21, 2011

(65) Prior Publication Data
US 2012/0198998 A1  Aug. 9, 2012

(30) Foreign Application Priority Data
Oct. 14, 2009 (JP) ................................ 2009-237415

(51) Int. Cl.
*B01D 53/02* (2006.01)
(52) U.S. Cl.
USPC .................. 96/134; 96/121; 96/133; 96/136; 95/132; 95/143
(58) Field of Classification Search
USPC ............... 95/132, 143; 96/121, 133, 134, 136
See application file for complete search history.

(56) References Cited

U.S. PATENT DOCUMENTS 5,788,743 A * 8/1998 Watzenberger et al. .......... 95/94
(Continued)

FOREIGN PATENT DOCUMENTS

EP 2 407 232 A1 1/2012
(Continued)

OTHER PUBLICATIONS

Report on Outcome of Commission Committed by New Energy Development Organization 1980-1987, Development of Solar Power Generation for Practical Use, Verification of Low Cost Silicon Experiments (development of reduction of chlorosilane by hydrogen), summary version, New Energy and Industrial Technology Development Organization, Nov. 1988, 236 pgs. (with abridged translation in English).

*Primary Examiner* — Christopher P Jones
(74) *Attorney, Agent, or Firm* — Oblon, Spivak, McClelland, Maier & Neustadt, L.L.P.

(57) ABSTRACT

The reaction exhaust gas from which chlorosilanes and hydrogen chloride have been removed in a hydrogen chloride absorption unit (30) is introduced to an adsorption unit (50) to recover a purified hydrogen (S105). Activated carbon is packed in the adsorption unit (50), the gas, which is mainly composed of hydrogen, is passed through the activated carbon-packed layer during which unseparated chlorosilanes, hydrogen chloride, nitrogen, carbon monoxide, methane, and monosilane contained in the gas are adsorbed on the activated carbon and removed from the gas, and thereby the purified hydrogen is obtained. Nitrogen, carbon monoxide, methane and monosilane are a compressed gas in the state of adsorption, whereas hydrogen chloride and chlorosilanes are a liquid in the state of adsorption, and require a vaporization heat during desorption. Using these properties, the separation of hydrogen chloride and chlorosilanes from other impurity components is possible merely by separating the pathways for the desorbed gas.

20 Claims, 6 Drawing Sheets

(56) References Cited

U.S. PATENT DOCUMENTS

| | | |
|---|---|---|
| 2009/0165646 A1 | 7/2009 | Gadre et al. |
| 2010/0292524 A1* | 11/2010 | Turner et al. ................ 585/802 |
| 2011/0044878 A1 | 2/2011 | Sakida et al. |
| 2012/0145000 A1* | 6/2012 | Chaubey et al. ................ 95/148 |

FOREIGN PATENT DOCUMENTS

| | | |
|---|---|---|
| JP | 11-49509 | 2/1999 |
| JP | 2001-353420 | 12/2001 |
| JP | 2003-95635 | 4/2003 |
| JP | 2006-131491 | 5/2006 |
| JP | 2008-143775 | 6/2008 |
| JP | 2008-143776 | 6/2008 |
| JP | 2009-256143 | 11/2009 |
| WO | WO 2010/103847 A1 | 9/2010 |

* cited by examiner

HYDROGEN GAS RECOVERY SYSTEM AND HYDROGEN GAS SEPARATION AND RECOVERY METHOD

TECHNICAL FIELD

The present invention relates to a hydrogen gas recovery system and a method for separating and recovering a hydrogen gas, and more specifically relates to a technology of separation and recovery of hydrogen from a reaction exhaust gas discharged from a polycrystalline silicon production apparatus using trichlorosilane as a raw material, and cyclic usage of hydrogen.

BACKGROUND ART

The reactions mainly represented by the following equations proceed in the process of producing polycrystalline silicon using trichlorosilane ($HSiCl_3$) as a raw material, and polycrystalline silicon is produced in Equation 1.

(Equation 1)

(Equation 2)

A higher concentration of trichlorosilane as a raw material and a higher reaction pressure are currently sought for the purpose of power saving in the process of producing polycrystalline silicon and for the sake of increasing the deposition rate of polycrystalline silicon. Accordingly, the reaction represented by the Equation 2 has a strong tendency to proceed in priority to the reaction represented by the Equation 1, and as a result, higher amounts of tetrachlorosilane ($SiCl_4$) and hydrogen ($H_2$) as byproducts tend to be produced as compared with the conventional process.

Since it is possible, to convert tetrachlorosilane and hydrogen as byproducts produced according to the Equation 2 to trichlorosilane by the reverse reaction of the Equation 2, re-use of these byproducts as raw material gas for the production of polycrystalline silicon is carried out. Reduction in loss of the byproducts and efficient conversion of the byproducts to trichlorosilane, or recovery, circulation and re-use of the exhaust gas discharged from the polycrystalline silicon production system are currently sought.

The reaction exhaust gas from the polycrystalline silicon production system (apparatus) contains tetrachlorosilane, hydrogen, and a small amount of hydrogen chloride (HCl) as represented by the Equations 1 and 2 and unreacted trichlorosilane as well as other byproduct gases such as a small amount of monochlorosilane ($SiH_3Cl$) and dichlorosilane ($SiH_2Cl_2$). Further, the reaction exhaust gas contains carbon monoxide (CO), methane ($CH_4$), monosilane ($SiH_4$), and nitrogen ($N_2$) as trace impurities. Tetrachlorosilane, trichlorosilane, dichlorosilane and monochlorosilane are collectively referred to as chlorosilanes, and its liquid as a chlorosilane liquid hereinbelow.

The reaction exhaust gas from the polycrystalline silicon production apparatus is separated into hydrogen and other components in a hydrogen recovery and circulation unit which is directly connected to the polycrystalline silicon production apparatus, and the hydrogen separated is re-introduced to the polycrystalline silicon production apparatus by circulation. Such a hydrogen separation and recovery method is known from, for example, "Report on Outcome of Commission Committed by New Energy Development Organization 1980-1987, Development of Solar Power Generation for Practical Use, Verification of Low Cost Silicon Experiments (development of reduction of chlorosilane by hydrogen), summary version" (Non-Patent Literature 1) and JP2008-143775A (Patent Literature 1).

Condensation, which is commonly used for separating components having a greatly different boiling point from each other, is adopted for separation of chlorosilanes in the technology disclosed in these literatures.

Further, gas absorption by a chlorosilane liquid is adopted for separation of hydrogen chloride. Since the solubility of hydrogen chloride in the chlorosilane liquid is not high, the separation of hydrogen chloride by gas absorption must be conducted at a low temperature (−20° C. or lower); however, efficient separation can be performed through sufficient heat-recovery and the like.

Finally, a small amount of remaining chlorosilanes, hydrogen chloride and other impurities are adsorbed on activated carbon for separation. The adsorption separation method utilizes the phenomenon that the amount of impurities adsorbed on the surface of an adsorbent such as activated carbon increases at a higher pressure and a lower temperature, whereas it decreases at a lower pressure and a higher temperature, and therefore the adsorption method is carried out at a batch type operating alternately adsorption at a high pressure and a low temperature and regeneration at a low pressure and a high temperature.

A commonly-used activated carbon adsorption column has a plurality of activated carbon-packed columns which are switched over selectively for use. Activated carbon loses its ability of adsorption after it is used for a certain time period. This is called breakthrough, and the column is switched over to a regenerated activated carbon-packed column before the breakthrough occurs. The activated carbon after use is regenerated after adsorbed components have been released by purging with a carrier gas at a low pressure and a high temperature. This is called desorption of adsorbed components. The carrier gas for regeneration of activated carbon requires a high purity which is similar to that of recovered hydrogen. A recovered hydrogen which is purified in an activated carbon adsorption column is commonly used as a carrier gas, or a high-purity hydrogen is supplemented from the outside. The carrier gas together with desorbed components is then released from the activated carbon adsorption column as a desorbed gas.

Most parts of hydrogen used as the carrier gas are the hydrogen consumed at the exhaust gas recovery step.

Accordingly, reduction of supplemental hydrogen as a carrier gas and efficient recovery and re-use of desorbed gas are the key elements for cost reduction in the polycrystalline silicon production system which has a step for converting tetrachlorosilane to trichlorosilane.

CITATION LIST

Patent Literature

Patent Literature 1: JP2008-143775A

Non-Patent Literature

Non-Patent Literature 1: "Report on Outcome of Commission Committed by New Energy Development Organization 1980-1987, Development of Solar Power Generation for Practical Use, Verification of Low Cost Silicon Experiments (development of reduction of chlorosilane by hydrogen), summary version" (New Energy and Industrial Technology Development Organization, November 1988)

SUMMARY OF INVENTION

Technical Problem

According to the method disclosed in the Non-Patent Literature 1, hydrogen as a carrier gas is supplemented from the outside, and a desorbed gas is sent to the step of converting tetrachlorosilane to trichlorosilane for re-use. However, while the problem that loss of hydrogen inevitably occurs is recognized, no effective measure to tackle this problem has been found.

The method disclosed in the Patent Literature 1 re-uses chlorosilanes contained in the desorbed gas; however, re-use of hydrogen or hydrogen chloride is not considered in the method at all.

It is important to reduce, as much as possible, the amount of a raw material gas used in order to obtain polycrystalline silicon at a lower cost, and for this purpose, an economic system which can reduce, as much as possible, the amount of the hydrogen gas supplemented from the outside without decreasing the recovery of chlorosilanes, hydrogen chloride and a hydrogen gas while taking into account the step of converting from tetrachlorosilane to trichlorosilane is sought.

The present invention has been made taking the above problems into account, and an object of the present invention is to provide a technology of reducing, as much as possible, the supplemental amount of the hydrogen gas used to separate chlorosilanes, hydrogen chloride, nitrogen, carbon monoxide, methane and monosilane from the reaction exhaust gas discharged from a polycrystalline silicon production apparatus by effectively utilizing the separation and re-use of a desorbed gas, and producing a high-purity polycrystalline silicon at a low cost.

Solution to Problem

For solving the above problems, the present invention provides a hydrogen gas recovery system used for separating and recovering a hydrogen gas from a reaction exhaust gas discharged from an apparatus for producing polycrystalline silicon from trichlorosilane as a raw material, the system comprising: a condensation separation unit for condensing and separating chlorosilanes from the hydrogen-containing reaction exhaust gas discharged from a polycrystalline silicon production step; a compression unit for compressing the hydrogen-containing reaction exhaust gas discharged from the condensation separation unit; an absorption unit for absorbing and separating hydrogen chloride by contacting the hydrogen-containing reaction exhaust gas discharged from the compression unit with an absorption liquid; and an adsorption unit comprising a plurality of activated carbon-packed columns for adsorption removal of methane, hydrogen chloride, and chlorosilanes from the hydrogen-containing reaction exhaust gas discharged from the absorption unit; wherein each of the activated carbon-packed columns has a first line used as a discharge line for discharging a hydrogen gas as a carrier used for regeneration of the activated carbon in the activated carbon-packed column out of the system and a second line for circulating the hydrogen gas once discharged from the adsorption unit into the adsorption unit; and each column is configured in such a manner that the hydrogen gas can selectively be sent to any of the first and second lines, and the second line has a condensation separation part for chlorosilanes, a gas compression part and an absorption separation part for hydrogen chloride in this order.

In an aspect of the hydrogen gas recovery system of the present invention, the absorption separation part for hydrogen chloride can be the absorption unit. In a further aspect, the gas compression part can be the compression unit and the absorption separation part can be the absorption unit. In a further aspect, the condensation separation part for chlorosilanes can be the condensation separation unit, the gas compression part can be the compression unit and the absorption separation part can be the absorption unit.

Further, a method for separating and recovering a hydrogen gas of the present invention is a method for separating and recovering a hydrogen gas from a reaction exhaust gas discharged from an apparatus for producing polycrystalline silicon from trichlorosilane as a raw material, wherein the hydrogen gas recovery system of the present invention is used to carry out adsorption removal of methane, hydrogen chloride and chlorosilanes in at least one of the plurality of activated carbon-packed columns and concurrently carry out regeneration of activated carbon in the other activated carbon-packed columns, and the regeneration of activated carbon includes the following operations (1) and (2).

The operation (1) is an operation of decreasing a pressure in the activated carbon-packed column, and discharging adsorbates on activated carbon with a hydrogen carrier gas through the first line out of the system, and the operation (2) is an operation of, after the operation (1), switching the discharge line to the second line, heating the adsorption unit to increase the temperature of the activated carbon, thereby desorbing hydrogen chloride and chlorosilanes and then discharging out of the adsorption unit by a hydrogen carrier gas, recovering hydrogen chloride and chlorosilanes from the discharged gas, and circulating the hydrogen gas to the adsorption unit.

Liquid chlorosilanes can be used as the absorption liquid.

According to the present invention, the desorption and regeneration of adsorbed components from activated carbon in an activated carbon-packed column which adsorbed components other than hydrogen by being brought into contact with the reaction exhaust gas is performed with hydrogen as a carrier gas, and the desorption is carried out in two stages. That is, desorbed components and hydrogen together with the carrier gas fed to the activated carbon-packed column are discharged out of the system by purging the hydrogen gas from the activated carbon-packed column and decreasing the inner pressure of the column, and the carrier gas sending line is then switched over, and the activated carbon-packed column is heated to desorb hydrogen chloride and chlorosilanes, and recovery of hydrogen chloride and chlorosilanes and purification and recovery of hydrogen as the carrier gas is carried out.

As mentioned above, hydrogen is used at regeneration, and only a part of the hydrogen is discharged out of the system with a two-stage regeneration, and therefore the replacement step of an inert gas and hydrogen required for inert gas regeneration and the large consumption of hydrogen required for a one-stage regeneration with hydrogen as a carrier gas can be greatly reduced.

DESCRIPTION OF EMBODIMENTS

Embodiments of the present invention will be explained below with reference to the drawings.

Figure 1:
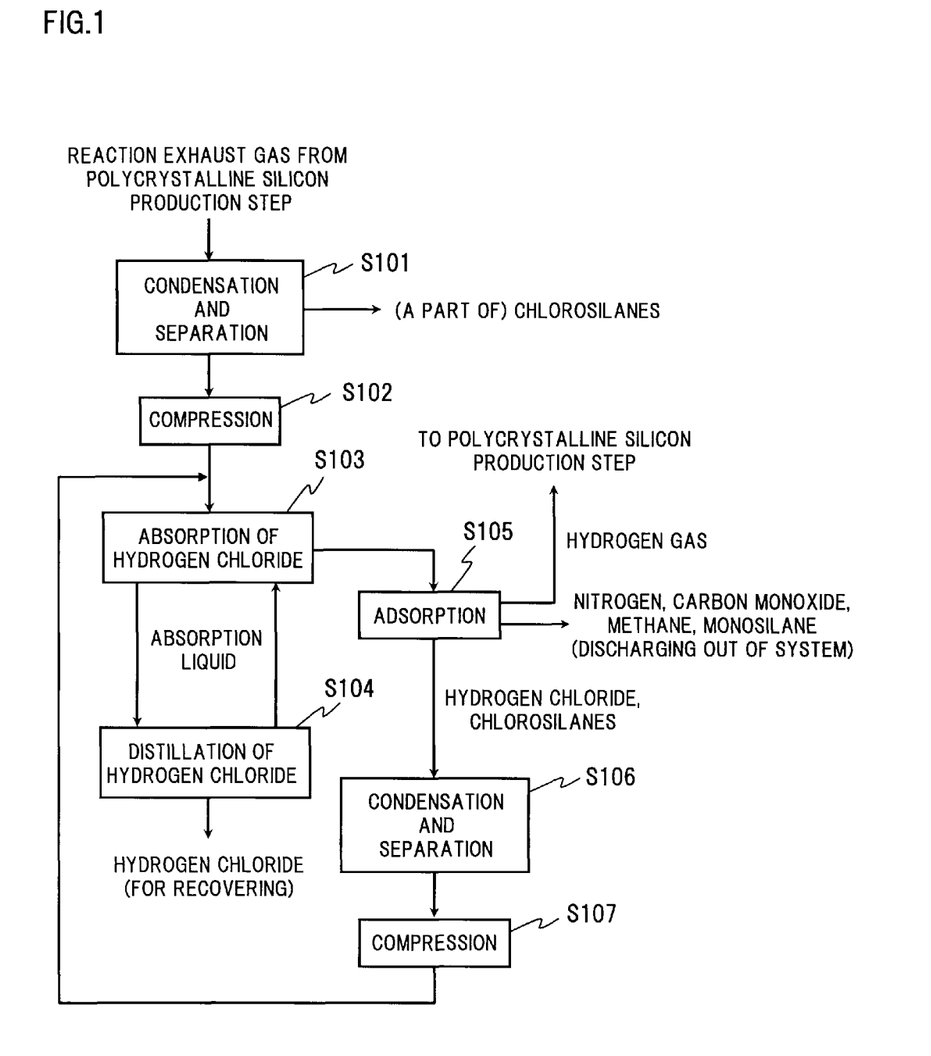
FIG. 1 is a flow chart for explaining each step of the exhaust gas separation and recovery method according to the present invention.
Figure 2:
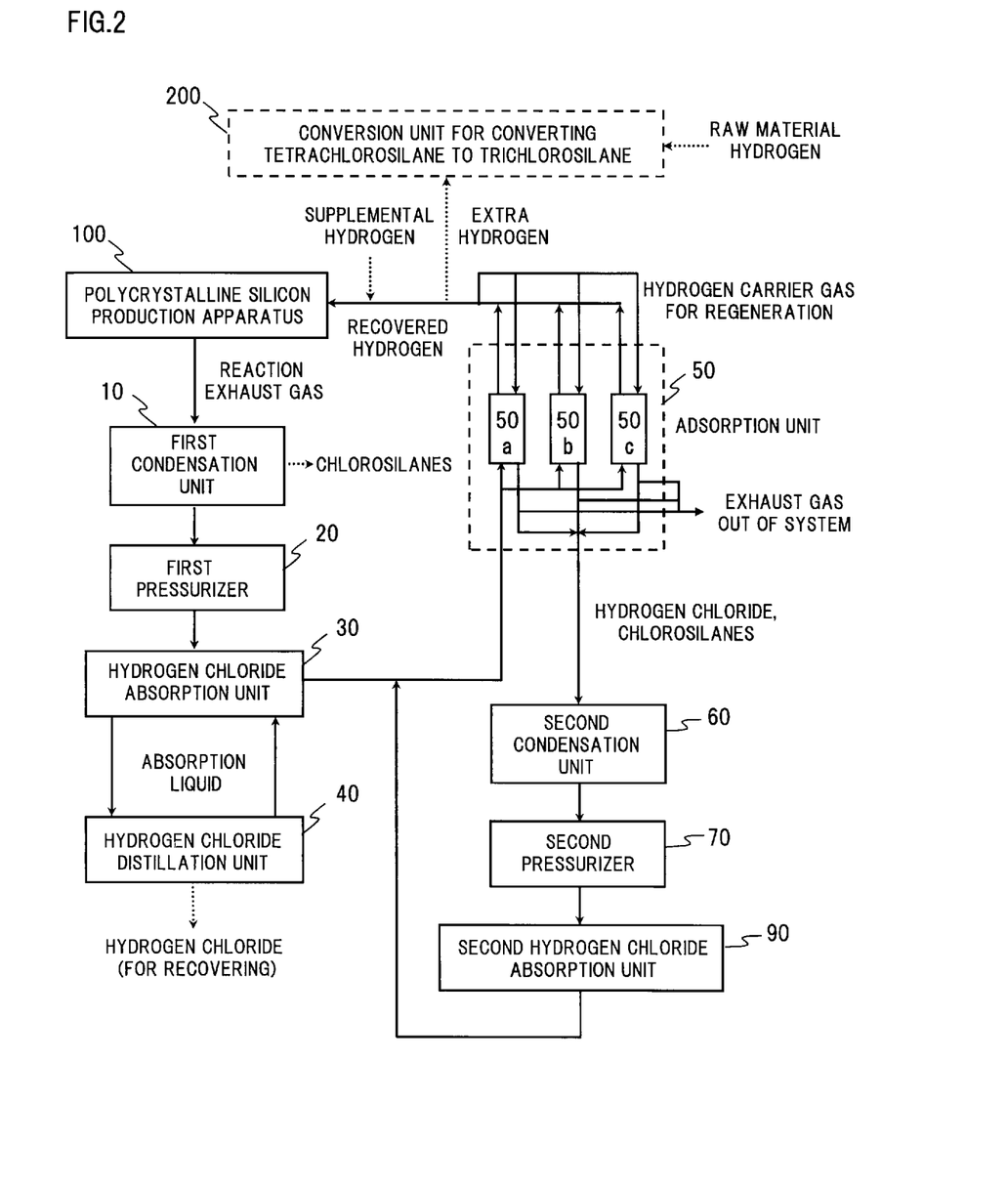
FIG. 2 is a diagram schematically illustrating an example of a configuration of the exhaust gas separation and recovery system according to the present invention.

FIG. 1 is a flow chart for explaining each step of the exhaust gas separation and recovery method according to the present invention, and FIG. 2 is a diagram which schematically illustrates an example of a configuration of the exhaust gas separation and recovery system according to the present invention.

A reaction exhaust gas discharged from a polycrystalline silicon production apparatus (100) is fed to a first condensation unit (10) where condensation and separation of chlorosilane is carried out (S101).

This condensation separation step removes (a part of) chlorosilanes prior to compressing the reaction exhaust gas, not to have a first pressurizer (20) used in the compression step (S102) damaged by liquefying the chlorosilanes, and to reduce the thermal load at a hydrogen chloride absorption step (S103), which will be explained below.

Specifically, the reaction exhaust gas from the polycrystalline silicon production apparatus is cooled to remove a part of the chlorosilanes from the reaction exhaust gas. The cooling temperature only needs to be not higher than the temperature at which the chlorosilanes do not condensate under the pressure after the compression in the compression step (S102). The temperature is preferably not higher than −10° C., and more preferably not higher than −20° C.

The reaction exhaust gas from the condensation separation step (S101) is sent to the compression step (S102). The pressurizer (20) is used at the compression step (S102) for separating, purifying, circulating and re-using the reaction exhaust gas, and the pressurizer (20) can be any pressurizer so far as it has mechanical and chemical durability, it can operate safely, and it does not change the composition of the reaction exhaust gas.

The reaction exhaust gas which is compressed and pressurized at the compression step (S102) contains unseparated chlorosilanes, hydrogen chloride, hydrogen, nitrogen, carbon monoxide, methane and monosilane. The chlorosilanes and hydrogen chloride contained in the reaction exhaust gas are therefore absorbed to an absorption liquid at the hydrogen chloride absorption step (S103). The absorption liquid which is mainly composed of liquid chrolosilanes is fed to a hydrogen chloride absorption unit (30) from a hydrogen chloride distillation unit (40), to absorb the chlorosilanes and hydrogen chloride contained in the reaction exhaust gas by making a gas-liquid contact between the reaction exhaust gas and the absorption liquid.

The hydrogen chloride absorption unit (30) to be used can include a packed column, a plate column, a spray column, and a wetted wall column, and the unit needs to make a continuous and efficient gas-liquid contact, because the solubility of hydrogen chloride in chlorosilanes is not large. The hydrogen chloride absorption step (S103) is preferably carried out at a low temperature and a high pressure. Specifically, the temperature can be in the range of from −30° C. to −60° C. and the pressure can be in the range of from 0.4 MPaG to 1.0 MPaG.

The absorption liquid in which hydrogen chloride is dissolved is introduced from the hydrogen chloride absorption unit (30) to the hydrogen chloride distillation unit (40) where separation of the hydrogen chloride gas is carried out at a temperature of from 50° C. to 140° C. (S104). The hydrogen chloride gas separated is recovered as a top fraction and can be re-used at a synthesis step of trichlorosilane and a step of converting from tetrachlorosilane to trichlorosilane. The absorption liquid is, after the separation of the hydrogen chloride gas, cooled to a temperature of from −30° C. to −60° C. and is then sent to the hydrogen chloride absorption unit (30) where it is re-used as an absorption liquid at the hydrogen chloride absorption step (S103).

The reaction exhaust gas from which chlorosilanes and hydrogen chloride are removed in the hydrogen chloride absorption unit (30) is introduced to an adsorption unit (50) where recovery of a purified hydrogen is carried out (S105). Activated carbon is packed in the adsorption unit (50) used at this step, and unseparated chlorosilanes and hydrogen chloride, nitrogen, carbon monoxide, methane and monosilane contained in the gas mainly composed of hydrogen are adsorbed on the activated carbon during the passage of the gas through the activated carbon-packed layer, thereby those components are removed from the gas and a purified hydrogen is obtained.

The adsorption unit (50) has a plurality (say three) of activated carbon-packed columns (50a, 50b and 50c) so that at least one column can perform the adsorption step (S105) any time as shown in FIG. 2. These activated carbon-packed columns function as an adsorption column, and it is possible that one activated carbon-packed column carries out desorption and regeneration by heating during which other activated carbon-packed columns perform the adsorption step (S105).

The desorption and regeneration of the activated carbon-packed columns by heating is carried out in two stages as mentioned below. First, the pressure is decreased in the activated carbon-packed column for desorption and regeneration by heating. This is because desorption proceeds more advantageously under lower-pressure conditions and the pressure is decreased to 0.03 MPa or lower. After the pressure is decreased, a part of the hydrogen that is recovered at the adsorption unit (50) is passed as a carrier gas for regeneration through the activated carbon-packed column of interest, and thereby impurities such as nitrogen, carbon monoxide, methane and monosilane are discharged therefrom. The hydrogen containing the impurities is discharged out of the system; however, as a matter of course, this hydrogen can be regenerated in a hydrogen purification and recovery line, which is different from those described later.

The activated carbon-packed column is then heated from 140° C. to 170° C. Hydrogen chloride and chlorosilanes are desorbed from the surface of the activated carbon by heating and are then expelled with a carrier gas of hydrogen out of the activated carbon-packed column, thereby regeneration of the activated carbon is completed. The hydrogen, which contains hydrogen chloride and the like, is recovered and purified as described below. It is noted that the column having regenerated activated carbon can be used for adsorption again merely by decreasing the temperature and increasing the pressure to those suitable for adsorption.

Each of the activated carbon-packed columns (50a, 50b and 50c) has a discharge line (a first line) and a second line, the first line being for discharging out of the system a desorbed gas (impurities such as nitrogen, carbon monoxide, methane and monosilane) produced when the pressure is decreased at the regeneration step of activated carbon as described above, and the second line being for once discharging out of the adsorption unit (50) a desorbed gas (hydrogen chloride and chlorosilanes) produced at the regeneration of activated carbon after the pressure is decreased, followed by circulating the desorbed gas to the adsorption unit (50) again, and in FIG. 2, a second condensation unit (60), which is a condensation separation part for chlorosilanes, a second pressurizer (70), which is a gas compression part, and a second hydrogen chloride absorption unit (90), which is an absorption separation part for hydrogen chloride, are provided in this order.

Each of the activated carbon-packed columns has a function to select whether the hydrogen gas (-containing discharged gas) should be sent via the first or second line.

A two-stage procedure depending on heating or non-heating is described in the above explanation; however, it actually takes time to increase the temperature of an activated carbon-packed column in a commercially available unit, and therefore it may not be realistic to provide the stage depending on heating or non-heating. Alternatively, the following method may be used: the pressure is decreased in the activated carbon-packed column and methane and the like are desorbed and discharged out of the system together with a carrier gas, and at the same time, heating is initiated at the first stage; and when the temperature of the packed column exceeds a certain temperature such as 100° C., the discharge line for a carrier gas can be switched over at the second stage to recover hydrogen chloride.

The switching operation can be controlled by time passed from the initiation of regeneration, rather than by the temperature. The two stages at the desorption and regeneration of the activated carbon-packed column by heating as described above therefore mean a stage where the discharge line is selected to discharge the gas discharged from the packed column out of the system, and a stage where a line is selected to return the gas to the adsorption unit after it is treated to recover hydrogen chloride and chlorosilane.

The hydrogen recovery system according to the present invention may have the aspect shown in FIG. 2 and other aspects shown in FIGS. 3 to 6.

Figure 3:
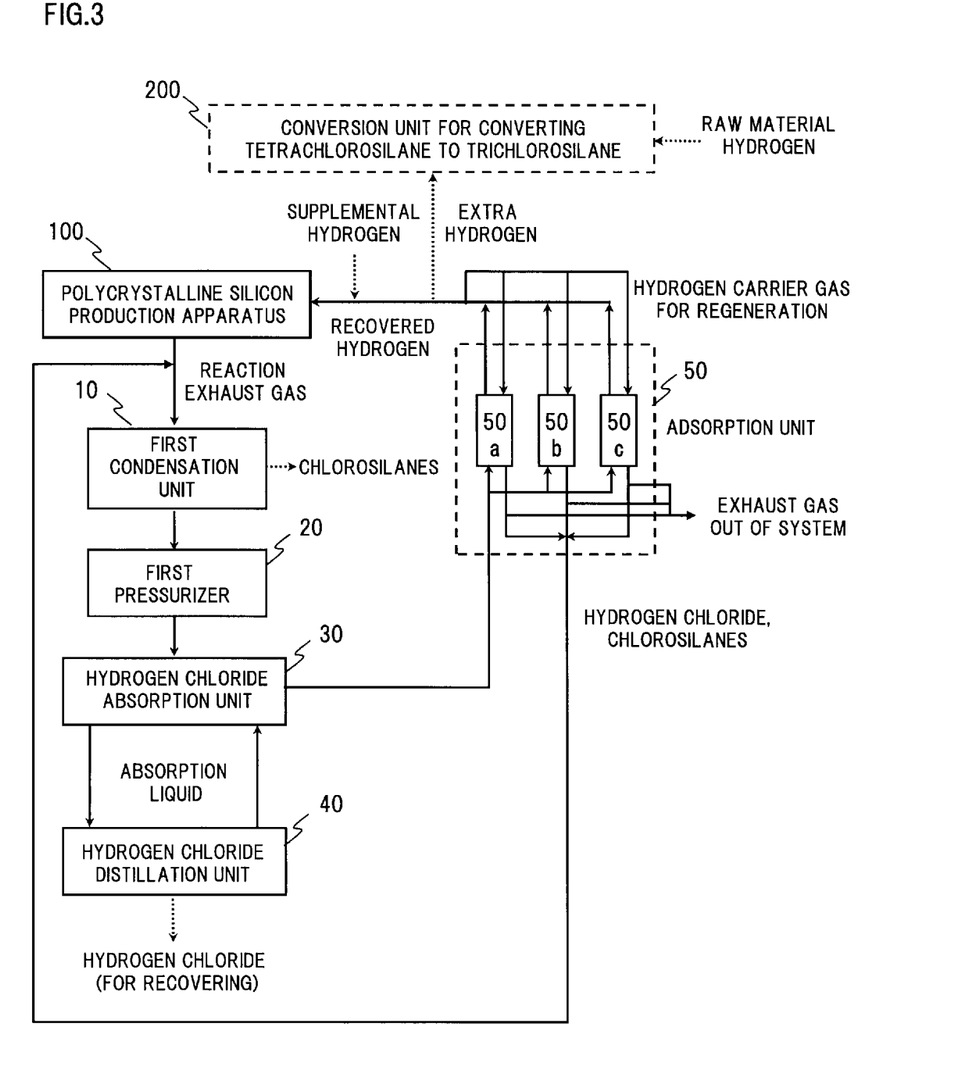
FIG. 3 is a diagram schematically illustrating a further example of a configuration of the exhaust gas separation and recovery system according to the present invention.

In the aspect shown in FIG. 3, the first condensation unit (10) as a condensation separation part for chlorosilanes, the first pressurizer (20) as a gas compression part and the hydrogen chloride absorption unit (30) as a absorption separation part are used. Accordingly, the desorbed gas (hydrogen chloride and chlorosilanes) generated at the time of regeneration of activated carbon and then discharged out of the adsorption unit (50) is transferred to the first condensation unit (10), the first pressurizer (20) and the hydrogen chloride absorption unit (30) provided on the second line in this order and is then circulated again to the adsorption unit (50).

Figure 4:
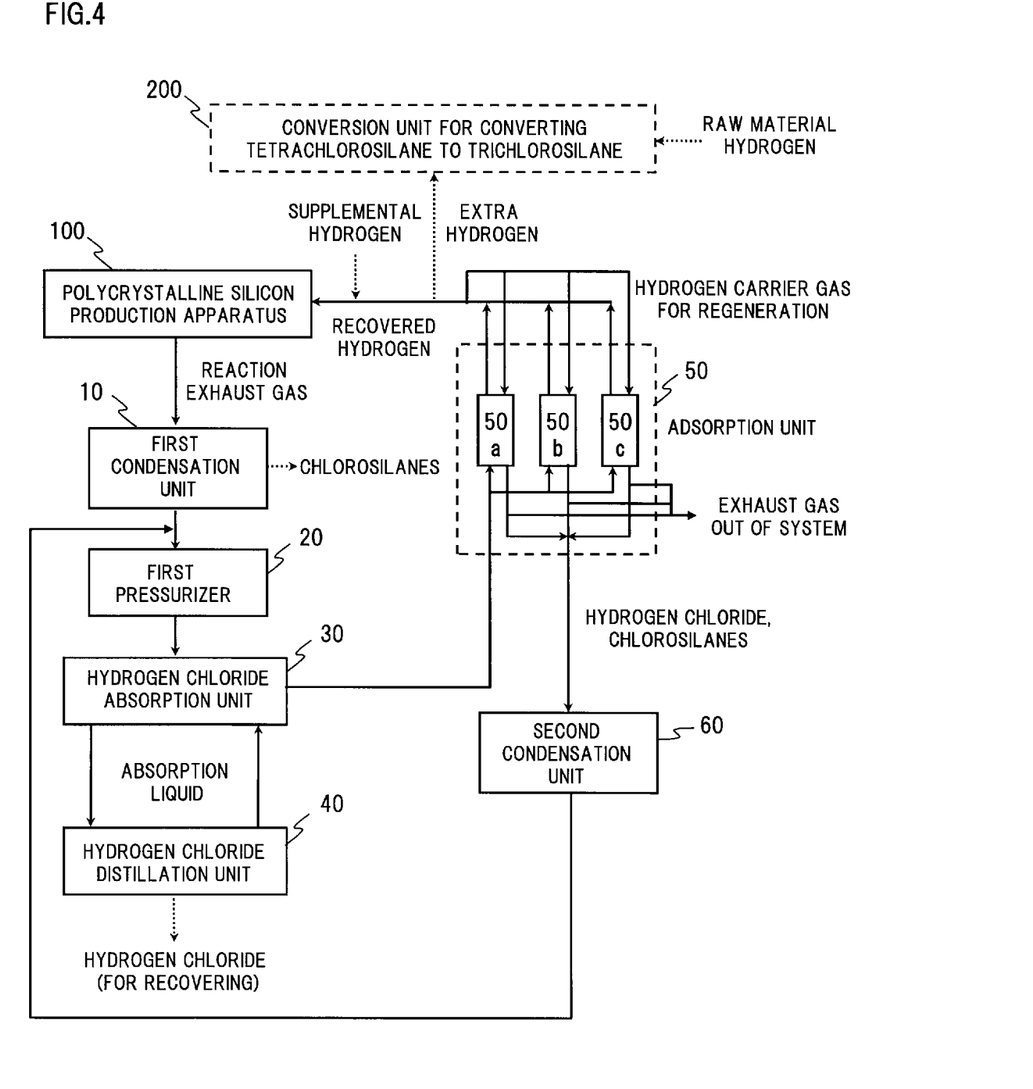
FIG. 4 is a diagram schematically illustrating a further example of a configuration the exhaust gas separation and recovery system according to the present invention.

In the aspect shown in FIG. 4, the second condensation unit (60) as a condensation separation part for chlorosilanes, the first pressurizer (20) as a gas compression part, and the hydrogen chloride absorption unit (30) as an absorption separation part are used. Accordingly, the desorbed gas (hydrogen chloride and chlorosilanes) generated at the time of regeneration of activated carbon and then discharged out of the adsorption unit (50) is transferred to the second condensation unit (60), the first pressurizer (20) and the hydrogen chloride absorption unit (30) provided on the second line in this order and is then circulated again to the adsorption unit (50).

Figure 5:
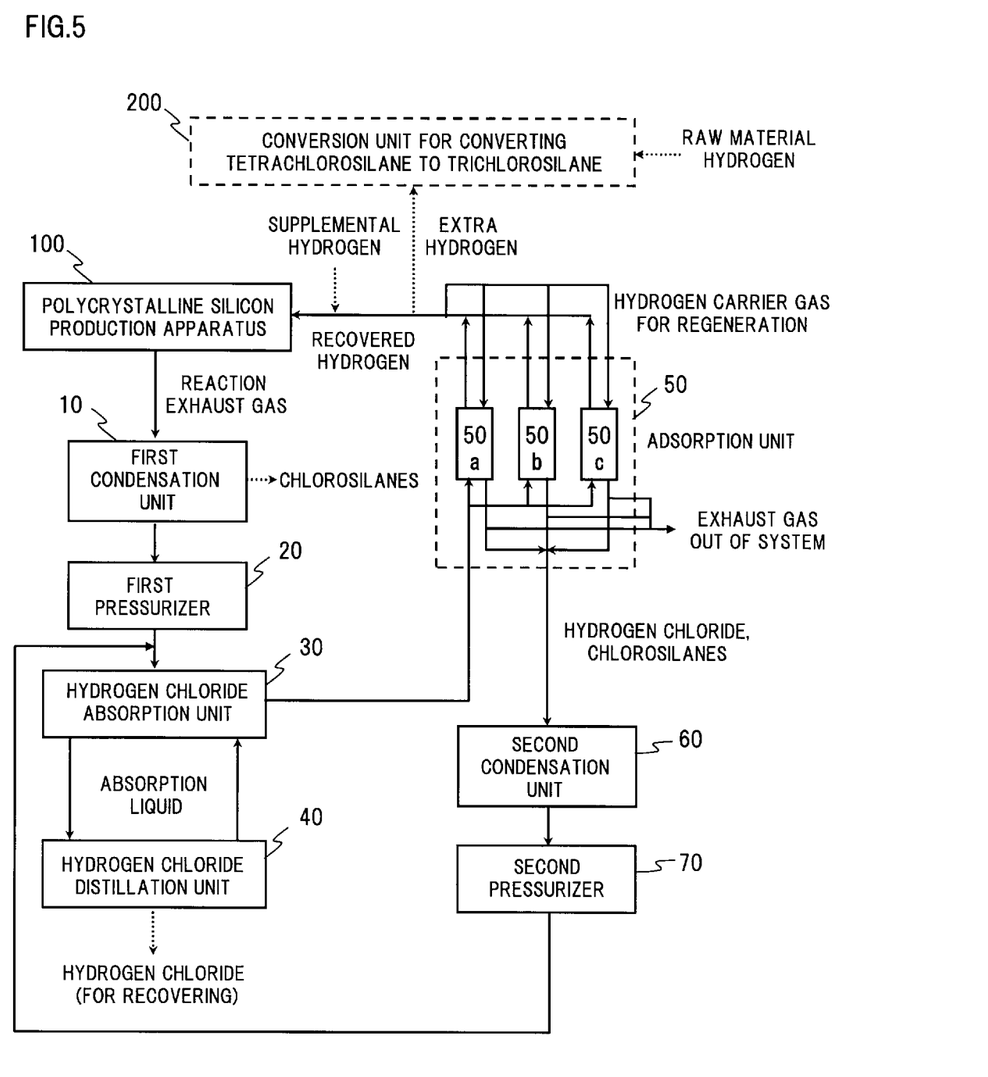
FIG. 5 is a diagram schematically illustrating a further example of a configuration of the exhaust gas separation and recovery system according to the present invention.

In the aspect shown in FIG. 5, the second condensation unit (60) as a condensation separation part for chlorosilanes, the second pressurizer (70) as a gas compression part, and the hydrogen chloride absorption unit (30) as an absorption separation part are used. Accordingly, the desorbed gas (hydrogen chloride and chlorosilanes) generated at the time of regeneration of activated carbon and then discharged out of the adsorption unit (50) is transferred to the second condensation unit (60), the second pressurizer (70) and the hydrogen chloride absorption unit (30) provided on the second line in this order and is then circulated again to the adsorption unit (50).

Figure 6:
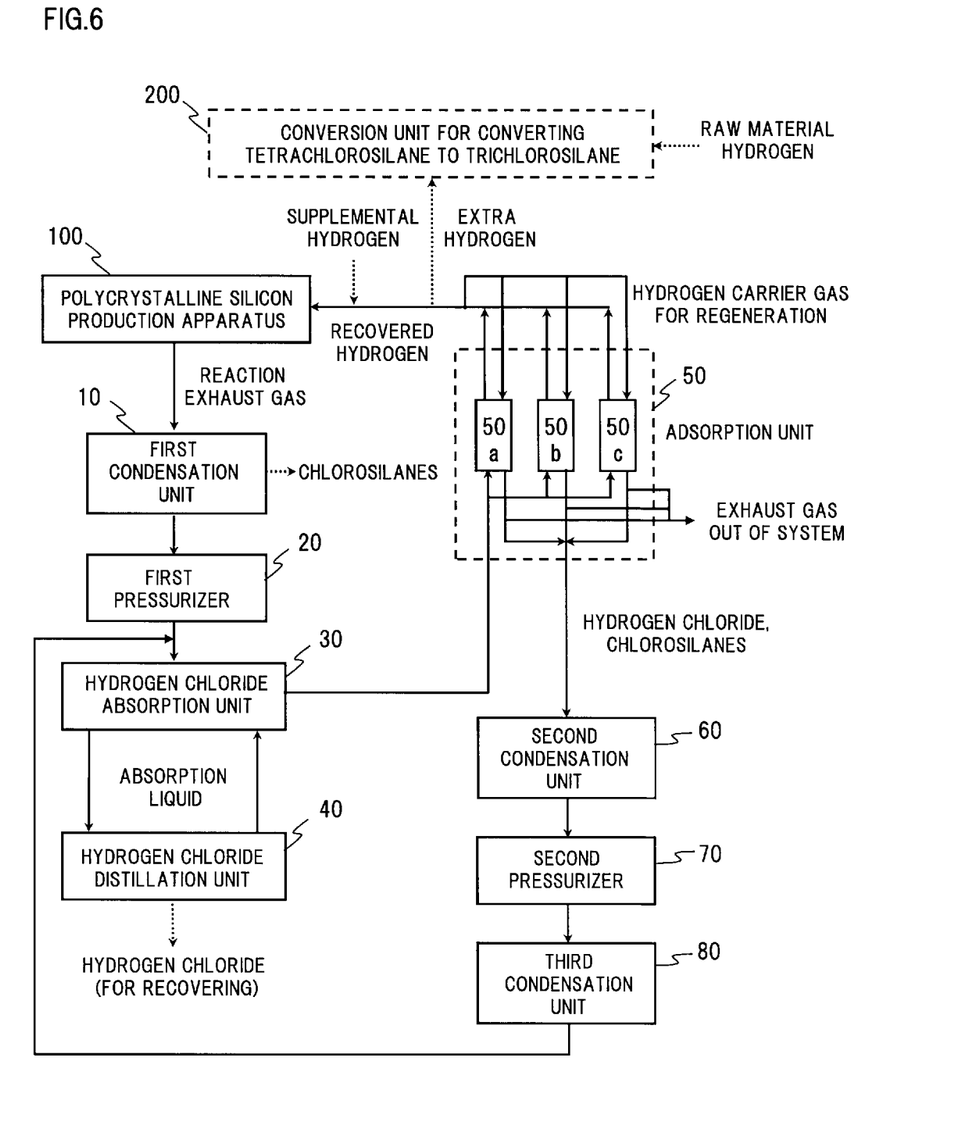
FIG. 6 is a diagram schematically illustrating a further example of a configuration of the exhaust gas separation and recovery system according to the present invention.

The aspect shown in FIG. 6 is the same as that of FIG. 5 except a third condensation unit (80) is provided between the second pressurizer (70) and the hydrogen chloride absorption unit (30).

In conventional regeneration of an activated carbon-packed column, a single-stage regeneration method using an inert gas such as nitrogen or a carrier gas of hydrogen has been carried out. Although the cost for a nitrogen gas for desorption can be lowered by use of an economical nitrogen gas, a large amount of hydrogen needs to be used when the gas in the column is switched from nitrogen to hydrogen for re-use.

A hydrogen gas containing methane and hydrogen chloride is produced when hydrogen is used as a carrier gas, and when such hydrogen gas is regenerated for production of a polycrystalline silicon, it is difficult to remove both of methane and hydrogen chloride from the hydrogen gas with a simple operation and the gas cannot be returned to the hydrogen gas recovery and purification system without some additional units as in the present invention.

The present invention enables separation of hydrogen chloride and chlorosilanes from other impurity components merely by employing such a simple configuration that the pathway for a desorbed gas produced when the pressure is decreased at the time of regeneration of activated carbon is separated from the pathway for a desorbed gas produced when the activated carbon is heated at the time of regeneration for the following reasons.

The state of adsorption of each component on the surface of activated carbon can be estimated from the following relation between an adsorption temperature (represented by $T_{ad}$) and a critical temperature ($T_c$) of each component.

Liquid: $T_{ad} \ll T_c$
Liquid+Compressed Gas: $T_{ad} \approx T_c$
Compressed Gas: $T_{ad} > T_c$ When the adsorption temperature ($T_{ad}$) is determined as an ambient temperature (30° C.), the state, on the surface of activated carbon, of adsorption of each component of the gas coming into the adsorption column is as follows.

TABLE 1

| Component Name | Content | Critical Temperature ($T_c$) | Adsorption State |
|---|---|---|---|
| Hydrogen | Mainly | −239.9° C. | Compressed Gas |
| Nitrogen | Trace | −146.9° C. | Compressed Gas |
| Carbon Monoxide | Trace | −139.8° C. | Compressed Gas |
| Methane | Trace | −82.5° C. | Compressed Gas |
| Monosilane | Trace | −3.5° C. | Compressed Gas |
| Hydrogen Chloride | Less | 51.5° C. | Liquid + Compressed gas |
| Monochlorosilane | Small Amount | 123.5° C. | Liquid |
| Dichlorosilane | Less | 176.3° C. | Liquid |
| Trichlorosilane | Less | 206.0° C. | Liquid |
| Tetrachlorosilane | Small Amount | 233.8° C. | Liquid |

In regeneration of activated carbon, nitrogen, carbon monoxide, methane and monosilane are a compressed gas at the state of adsorption, and these components are easily desorbed merely by decreasing the pressure below the adsorption pressure without giving a vaporization heat. In contrast, hydrogen chloride and chlorosilanes are a liquid at the state of adsorption, and it is necessary to give a vaporization heat for desorption.

An adsorption step at a high pressure and a low temperature and a regeneration step at a low temperature and a high pressure are repeated in an activated carbon-packed column, and reduction in pressure is usually completed in a short time period whereas heating usually takes a long time period even when the decrease in pressure and the heating are initiated simultaneously at the transition stage from the adsorption step to the regeneration step. This is because the activated carbon-packed layer has a low thermal conductivity and a high thermal capacity.

The present invention utilizes this property and enables the separation of hydrogen chloride and chlorosilanes from other impurity components merely by separating the pathway for a desorbed gas at the stage of decreasing the pressure at the initiation of the regeneration step for the activated carbon-packed column, with the pathway for a desorbed gas at the later stage of regeneration by heating.

More specifically, according to the present invention, the desorbed gas containing impurities such as nitrogen, carbon monoxide, methane and monosilane produced at the stage of decreasing the pressure in the initiation of the regeneration step is released out of the system, whereas the desorbed gas containing hydrogen chloride and chlorosilanes produced at the stage of regeneration by heating is circulated to the hydrogen chloride absorption step (S103) via the second condensation step (S106) using the first condensation unit (10) and the second condensation unit (60) for condensation of chlorosilane at a temperature in the range of from −30 to −60° C. and the second compression step (S107) using the first pressurizer (20) and the second pressurizer (70). If necessary, the third condensation unit (80) can be provided for improved condensation as shown in FIG. 6.

In this circulation of the reaction exhaust gas, the hydrogen gas discharged out of the system is limited to the one which is discharged with the desorbed gas (impurities such as nitrogen, carbon monoxide, methane and monosilane) produced at the time of decreasing the pressure in the activated carbon regeneration step, and the amount of a supplemental hydrogen gas from the outside of the system can be greatly reduced.

The recovered hydrogen purified at the adsorption step (S105) is sent to the polycrystalline silicon production apparatus (100) through a circulation pathway for re-use. The purified hydrogen does not contain hydrogen chloride or impurity elements harmful when incorporated in silicon crystals such as compounds of boron, phosphorus, arsenic, carbon, etc. and has a sufficient purity for production of a high-purity polycrystalline silicon.

According to the present invention, the compression step (S102) and the hydrogen chloride absorption step (S103) are provided after the condensation separation step (S101) for separation of chlorosilanes. This is because hydrogen chloride is absorbed more easily at a lower temperature or a higher pressure, and these low-temperature and high-pressure conditions are also suitable for condensation of chlorosilanes, and chlorosilanes together with hydrogen chloride are hence removed by separation when the reaction exhaust gas is passed through the hydrogen chloride absorption unit (30).

This enables reduction in load for removing unseparated chlorosilanes contained in the reaction exhaust gas at the adsorption step (S105), and can decrease the number of regenerations of the activated carbon column and is therefore advantageous for reduction of the amount of a carrier gas used for regeneration.

Pathways for supplemental hydrogen and extra hydrogen are provided to make a constant pressure in the reaction exhaust gas recovery system including the polycrystalline silicon production apparatus, and the pressure in the reaction exhaust gas recovery system depends on the balance between the amount of hydrogen as a byproduct produced in the polycrystalline silicon production, which is a factor for increasing the pressure, and the amount of the exhaust gas discharged out of the reaction exhaust gas recovery system, the amount of hydrogen consumed in the polycrystalline silicon production apparatus, and the amount of hydrogen dissolved in a chlorosilane liquid and expelled out of the system, which are factors for decreasing the pressure.

When the balance between the pressure-increasing factor and the pressure-decreasing factors is a plus, it is possible to take a hydrogen gas as extra hydrogen out of the system, and the conversion unit (200) can also be effectively used for conversion of tetrachlorosilane to trichlorosilane. When the balance is a minus, it is necessary to supply a hydrogen gas as a supplemental gas from the outside of the system.

EXAMPLE

An example of separating and recovering hydrogen from a reaction exhaust gas of a polycrystalline silicon production apparatus in accordance with the exhaust gas separation and recovery system of the present invention is provided below.

The reaction temperature in the polycrystalline silicon production apparatus is 1,060° C., the rate of feeding a raw material gas is 520 Nm$^3$/hr of hydrogen and 1,150 kg/hr of trichlorosilane. The discharge amount of each component of the reaction exhaust gas is shown in Table 2.

TABLE 2

| | |
|---|---|
| Hydrogen | 552 Nm$^3$/hr |
| Trichlorosilane | 640 kg/hr |
| Tetrachlorosilane | 425 kg/hr |
| Monochlorosilane | 2 kg/hr |
| Dichlorosilane | 54 kg/hr |
| Hydrogen Chloride | 3 kg/hr |
| Nitrogen | Below Analytical Limit |
| Carbon Monoxide | Below Analytical Limit |
| Methane | Below Analytical Limit |
| Monosilane | Below Analytical Limit |

The temperature at the condensation separation step (S101) is −20° C. The temperature and the pressure at the hydrogen chloride absorption step (S103) are −40° C. and 0.8 MPa, respectively. The temperature and the pressure at the adsorption step (S105) were 30° C. and 0.8 MPa, respectively, and the flow rate per hour of hydrogen as a carrier gas for use in regeneration was 62 Nm$^3$/hr. The temperature at the second condensation step (S106) was −40° C., and the desorbed gas was discharged out of the system only for the first two hours at regeneration.

The exhaust gas separation and recovery system according to the present invention was operated under the above conditions, and supplement of a hydrogen gas was unnecessary (the amount of supplemental hydrogen gas was 0 Nm$^3$/hr). The average flow rate per hour of the exhaust gas discharged out of the system was 4 Nm$^3$/hr, the average flow rate per hour of extra hydrogen sent to the step of converting tetrachlorosilane to trichlorosilane was 21 Nm$^3$/hr, the amount of hydrogen as a raw material fed to the conversion unit (200) for converting tetrachlorosilane to trichlorosilane was 23 Nm³/hr, and around 50% of the hydrogen consumed in the conversion unit (200) was able to be covered by recovered hydrogen.

INDUSTRIAL APPLICABILITY

As explained above, according to the present invention, it is possible to minimize the amount of hydrogen supplemented to the circulation system and the amount of hydrogen released out of the system when hydrogen chloride, chlorosilanes, and a small amount of other impurities contained in the reaction exhaust gas produced from the polycrystalline silicon production apparatus using trichlorosilane as a raw material are separated and a purified hydrogen is circulated for re-use.

REFERENCE SIGNS LIST

10 First Condensation Unit
20 First Pressurizer
30 Hydrogen Chloride Absorption Unit
40 Hydrogen Chloride Distillation Unit
50 Adsorption Unit
60 Second Condensation Unit
70 Second Pressurizer
80 Third Condensation Unit
90 Second Hydrogen Chloride Absorption Unit
100 Polycrystalline Silicon Production Apparatus
200 Conversion Unit for Converting Tetrachlorosilane to Trichlorosilane

| Reference Signs List | |
| --- | --- |
| 10 | First Condensation Unit |
| 20 | First Pressurizer |
| 30 | Hydrogen Chloride Absorption Unit |
| 40 | Hydrogen Chloride Distillation Unit |
| 50 | Adsorption Unit |
| 60 | Second Condensation Unit |
| 70 | Second Pressurizer |
| 80 | Third Condensation Unit |
| 90 | Second Hydrogen Chloride Absorption Unit |
| 100 | Polycrystalline Silicon Production Apparatus |
| 200 | Conversion Unit for Converting Tetrachlorosilane to Trichlorosilane |

The invention claimed is:

1. A hydrogen gas recovery system comprising:
a condensation separation unit, which condenses and separates chlorosilanes from a hydrogen-comprising reaction exhaust gas discharged from a polycrystalline silicon production apparatus;
a compression unit, which compresses hydrogen-comprising reaction exhaust gas discharged from the condensation separation unit;
an absorption unit, which absorbs and separates hydrogen chloride by contacting the hydrogen-comprising reaction exhaust gas discharged from the compression unit with an absorption liquid; and
an adsorption unit comprising a plurality of activated carbon-packed columns, which adsorptively remove methane, hydrogen chloride, and chlorosilanes from the hydrogen-comprising reaction exhaust gas discharged from the absorption unit;
wherein each of the activated carbon-packed columns has a first line used as a discharge line, which discharges a hydrogen gas as a carrier that regenerates activated carbon in an activated carbon-packed column outside the system and a second line that circulates the hydrogen gas once discharged from the adsorption unit into the adsorption unit; and each column is configured such that the hydrogen gas can selectively be sent to any of the first and second lines, and the second line has a condensation separation part for chlorosilanes, a gas compression part and an absorption separation part for hydrogen chloride in this order.

2. The hydrogen gas recovery system according to claim 1 wherein the absorption separation part for hydrogen chloride is the absorption unit.

3. The hydrogen gas recovery system according to claim 1 wherein the gas compression part is the compression unit and the absorption separation part is the absorption unit.

4. The hydrogen gas recovery system according to claim 1 wherein the condensation separation part for chlorosilanes is the condensation separation unit, the gas compression part is the compression unit and the absorption separation part is the absorption unit.

5. A method for separating and recovering a hydrogen gas from a reaction exhaust gas discharged from an apparatus for producing polycrystalline silicon from trichlorosilane as a raw material, comprising:
adsorptively removing methane, hydrogen chloride and chlorosilanes in at least one of the plurality of activated carbon-packed columns of the hydrogen gas recovery system of claim 1, and
concurrently regenerating activated carbon in the other activated carbon-packed columns,
wherein the regenerating of activated carbon comprises:
(1) decreasing a pressure in the activated carbon-packed column, and discharging adsorbates on the activated carbon with a hydrogen carrier gas through the first line out of the system, and then
(2) switching the discharge line to the second line, heating the adsorption unit to increase a temperature of the activated carbon, thereby desorbing hydrogen chloride and chlorosilanes and then discharging hydrogen chloride and chlorosilanes out of the adsorption unit by a hydrogen carrier gas, recovering hydrogen chloride and chlorosilanes from the discharged gas, and circulating the hydrogen gas to the adsorption unit.

6. The method for separating and recovering a hydrogen gas according to claim 5 wherein the absorption liquid comprises a liquid chlorosilane.

7. A method for separating and recovering a hydrogen gas from a reaction exhaust gas discharged from an apparatus for producing polycrystalline silicon from trichlorosilane as a raw material, comprising:
adsorptively removing methane, hydrogen chloride and chlorosilanes in at least one of the plurality of activated carbon-packed columns of the hydrogen gas recovery system of claim 2, and
concurrently regenerating activated carbon in the other activated carbon-packed columns,
wherein the regenerating of activated carbon comprises:
(1) decreasing a pressure in the activated carbon-packed column, and discharging adsorbates on the activated carbon with a hydrogen carrier gas through the first line out of the system, and then
(2) switching the discharge line to the second line, heating the adsorption unit to increase the temperature of the activated carbon, thereby desorbing hydrogen chloride and chlorosilanes and then discharging hydrogen chloride and chlorosilanes out of the adsorption unit by a hydrogen carrier gas, recovering hydrogen chloride and chlorosilanes from the discharged gas, and circulating the hydrogen gas to the adsorption unit.

8. The method according to claim 7, wherein the absorption liquid comprises a liquid chlorosilane.

9. A method for separating and recovering a hydrogen gas from a reaction exhaust gas discharged from an apparatus for producing polycrystalline silicon from trichlorosilane as a raw material, comprising:
adsorptively removing methane, hydrogen chloride and chlorosilanes in at least one of the plurality of activated carbon-packed columns of the hydrogen gas recovery system of claim 3, and
concurrently regenerating activated carbon in the other activated carbon-packed columns,
wherein the regenerating of activated carbon comprises:
(1) decreasing a pressure in the activated carbon-packed column, and discharging adsorbates on the activated carbon with a hydrogen carrier gas through the first line out of the system, and then
(2) switching the discharge line to the second line, heating the adsorption unit to increase the temperature of the activated carbon, thereby desorbing hydrogen chloride and chlorosilanes and then discharging hydrogen chloride and chlorosilanes out of the adsorption unit by a hydrogen carrier gas, recovering hydrogen chloride and chlorosilanes from the discharged gas, and circulating the hydrogen gas to the adsorption unit.

10. The method according to claim 9, wherein the absorption liquid comprises a liquid chlorosilane.

11. A method for separating and recovering a hydrogen gas from a reaction exhaust gas discharged from an apparatus for producing polycrystalline silicon from trichlorosilane as a raw material, comprising:
adsorptively removing methane, hydrogen chloride and chlorosilanes in at least one of the plurality of activated carbon-packed columns of the hydrogen gas recovery system of claim 4, and
concurrently regenerating activated carbon in the other activated carbon-packed columns,
wherein the regenerating of activated carbon comprises:
(1) decreasing a pressure in the activated carbon-packed column, and discharging adsorbates on the activated carbon with a hydrogen carrier gas through the first line out of the system, and then
(2) switching the discharge line to the second line, heating the adsorption unit to increase the temperature of the activated carbon, thereby desorbing hydrogen chloride and chlorosilanes and then discharging hydrogen chloride and chlorosilanes out of the adsorption unit by a hydrogen carrier gas, recovering hydrogen chloride and chlorosilanes from the discharged gas, and circulating the hydrogen gas to the adsorption unit.

12. The method according to claim 11, wherein the absorption liquid comprises a liquid chlorosilane.

13. The hydrogen gas recovery system according to claim 1, wherein the absorption unit absorbs and separates hydrogen chloride by contacting the hydrogen-comprising reaction exhaust gas discharged from the compression unit with an absorption liquid, at a temperature of $-30°$ C. to $-60°$ C. and at a pressure of 0.4 MPaG to 1.0 MPaG.

14. The hydrogen gas recovery system according to claim 2, wherein the absorption unit absorbs and separates hydrogen chloride by contacting the hydrogen-comprising reaction exhaust gas discharged from the compression unit with an absorption liquid, at a temperature of $-30°$ C. to $-60°$ C. and at a pressure of 0.4 MPaG to 1.0 MPaG.

15. The hydrogen gas recovery system according to claim 3, wherein the absorption unit absorbs and separates hydrogen chloride by contacting the hydrogen-comprising reaction exhaust gas discharged from the compression unit with an absorption liquid, at a temperature of $-30°$ C. to $-60°$ C. and at a pressure of 0.4 MPaG to 1.0 MPaG.

16. The hydrogen gas recovery system according to claim 4, wherein the absorption unit absorbs and separates hydrogen chloride by contacting the hydrogen-comprising reaction exhaust gas discharged from the compression unit with an absorption liquid, at a temperature of $-30°$ C. to $-60°$ C. and at a pressure of 0.4 MPaG to 1.0 MPaG.

17. The hydrogen gas recovery system according to claim 1, wherein the condensation separation unit condenses and separates chlorosilanes from the hydrogen-comprising reaction exhaust gas, at a cooling temperature of not higher than $-10°$ C.

18. The hydrogen gas recovery system according to claim 2, wherein the condensation separation unit condenses and separates chlorosilanes from the hydrogen-comprising reaction exhaust gas, at a cooling temperature of not higher than $-10°$ C.

19. The hydrogen gas recovery system according to claim 3, wherein the condensation separation unit condenses and separates chlorosilanes from the hydrogen-comprising reaction exhaust gas, at a cooling temperature of not higher than $-10°$ C.

20. The hydrogen gas recovery system according to claim 4, wherein the condensation separation unit condenses and separates chlorosilanes from the hydrogen-comprising reaction exhaust gas, at a cooling temperature of not higher than $-10°$ C.

* * * * *